(12) United States Patent
Lanois et al.

(10) Patent No.: US 12,204,562 B2
(45) Date of Patent: Jan. 21, 2025

(54) DATA STORAGE STRUCTURE

(71) Applicant: Arm Limited, Cambridge (GB)

(72) Inventors: Thibaut Elie Lanois, Peymeinade (FR); Houdhaifa Bouzguarrou, Austin, TX (US); Guillaume Bolbenes, Vallauris (FR)

(73) Assignee: Arm Limited, Cambridge (GB)

( * ) Notice: Subject to any disclaimer, the term of this patent is extended or adjusted under 35 U.S.C. 154(b) by 91 days.

(21) Appl. No.: 18/152,946

(22) Filed: Jan. 11, 2023

(65) Prior Publication Data

US 2024/0232228 A1 Jul. 11, 2024

(51) Int. Cl.
*G06F 16/28* (2019.01)
*G06F 16/22* (2019.01)
*G06F 16/2457* (2019.01)

(52) U.S. Cl.
CPC ........ *G06F 16/285* (2019.01); *G06F 16/2228* (2019.01); *G06F 16/24578* (2019.01)

(58) Field of Classification Search
CPC .............. G06F 16/285; G06F 16/2228; G06F 16/24578
See application file for complete search history.

(56) References Cited

U.S. PATENT DOCUMENTS

| | | |
|---|---|---|
| 10,565,121 B2 | 2/2020 | Jiang |
| 2009/0235029 A1 | 9/2009 | Mouton et al. |
| 2010/0169382 A1* | 7/2010 | Sheaffer ............... G06F 12/1027 707/E17.014 |
| 2010/0281193 A1* | 11/2010 | Kojima ............... G06F 13/4059 710/52 |
| 2014/0195789 A1* | 7/2014 | Gupta ................... G06F 9/3806 712/239 |
| 2020/0210070 A1* | 7/2020 | Durham ................ G06F 3/0679 |
| 2021/0081435 A1 | 3/2021 | Kabra et al. |
| 2022/0067142 A1* | 3/2022 | Favor ................... G06F 12/1408 |
| 2022/0374359 A1* | 11/2022 | Yeung ................. G06F 12/0846 |
| 2022/0405209 A1* | 12/2022 | ChoFleming ....... G06F 12/0238 |

OTHER PUBLICATIONS

Search Report for GB Application No. 2318917.8 dated Jun. 12, 2024, 4 pages.

* cited by examiner

*Primary Examiner* — Huawen A Peng
(74) *Attorney, Agent, or Firm* — NIXON & VANDERHYE P.C.

(57) ABSTRACT

An apparatus has a data storage structure to store data items tagged by respective tag values and stores, in association with each data item, a respective tag group identifier to identify other data items having a same tag value within a collection of data items. The apparatus also has tag match circuitry to identify one or more hitting data items. Prioritisation circuitry is provided to select candidate data items which, relative to any other data items in the particular collection of data items having the same tag group identifier as the selected candidate data item is favoured according to an ordering of the data items. The prioritisation circuitry selects the one or more candidate data items before the identification of the hitting data items is available from the tag match circuitry. Data item selection circuitry selects a candidate data item for which the tag match circuitry detected a match.

19 Claims, 10 Drawing Sheets

| way | tag | offset | target | tag group ID |
|-----|-----|--------|--------|--------------|
| 0 | A | 3 | X | 2 |
| 1 | B | 2 | Y | 1 |
| 2 | A | 5 | Z | 2 | index → (above table); new data item → (row 1)

\* no data items with the same tag value so use default tag group ID for the way

FIG. 6A

| way | tag | offset | target | tag group ID |
|-----|-----|--------|--------|--------------|
| 0 | A | 3 | X | 0 |
| 1 | A | 2 | Y | 0 |
| 2 | B | 5 | Z | 2 | index → (above table); new data item → (row 1)

\* way 0 has a data item with the same tag value as the new data item so use tag group ID of that data item

FIG. 6B

| way | tag | offset | target | tag group ID |
|---|---|---|---|---|
| 0 | A | 3 | X | 0 |
| ~~1~~ | ~~A~~ | ~~2~~ | ~~Y~~ | ~~0~~ |
| 2 | B | 5 | Z | 2 | index → for deallocation →

* data item to be deallocated does not have default tag group ID for its way

FIG. 8A

| way | tag | offset | target | tag group ID |
|---|---|---|---|---|
| ~~0~~ | ~~A~~ | ~~3~~ | ~~X~~ | ~~0~~ |
| 1 | A | 2 | Y | 0 → 1 |
| 2 | B | 5 | Z | 2 | index → for deallocation →

* data item to be deallocated has default tag group ID for its way so other data items with that tag group ID need tag group ID to be changed

DATA STORAGE STRUCTURE

BACKGROUND

The present technique relates to the field of data processing. More particularly, the present technique relates to selecting a data item from a data storage structure.

In a data processing apparatus having a data storage structure to store data items, access will typically be provided to those data items to allow the apparatus to operate on those data items. Typically, the data items will be associated with an address and the data storage structure will be responsive to a data access operation specifying a particular address to return a data item associated with that particular address, if a data item with that address is stored by the data storage structure.

SUMMARY

In one example arrangement, there is provided an apparatus comprising: a data storage structure to store data items tagged by respective tag values, wherein the data storage structure is arranged to store, in association with each data item, a respective tag group identifier to identify other data items having a same tag value within a collection of data items; and tag match circuitry responsive to a data access operation to identify one or more hitting data items by comparing a particular tag value specified by the data access operation with tag values of a particular collection of data items identified by the data access operation; prioritisation circuitry to select one or more candidate data items, each selected candidate data item comprising a data item which, relative to any other data items in the particular collection of data items having the same tag group identifier as the selected candidate data item is favoured according to an ordering of the data items; wherein the prioritisation circuitry is configured to select the one or more candidate data items before the identification of the hitting data items is available from the tag match circuitry; and data item selection circuitry configured to select as a selected data item for the data access operation, a candidate data item for which the tag match circuitry detected a match.

In another example arrangement, there is provided a method of selecting a data item from a data storage structure, the method comprising: storing data items tagged by respective tag values, wherein the storing comprises storing, in association with each data item, a respective tag group identifier to identify other data items having a same tag value within a collection of data items; identifying one or more hitting data items by comparing a particular tag value specified by a data access operation with tag values of a particular collection of data items identified by the data access operation; selecting one or more candidate data items, each selected candidate data item comprising a data item which, relative to any other data items in the particular collection of data items having the same tag group identifier as the selected candidate data item is favoured according to an ordering of the data items; wherein selecting the one or more candidate data items is performed before the identification of the hitting data items is available; and selecting as a selected data item for the data access operation, a candidate data item for which the tag match circuitry detected a match.

In a yet further example arrangement, there is provided a non-transitory computer-readable medium to store computer-readable code for fabrication of an apparatus comprising: a data storage structure to store data items tagged by respective tag values, wherein the data storage structure is arranged to store, in association with each data item, a respective tag group identifier to identify other data items having a same tag value within a collection of data items; and tag match circuitry responsive to a data access operation to identify one or more hitting data items by comparing a particular tag value specified by the data access operation with tag values of a particular collection of data items identified by the data access operation; prioritisation circuitry to select one or more candidate data items, each selected candidate data item comprising a data item which, relative to any other data items in the particular collection of data items having the same tag group identifier as the selected candidate data item is favoured according to an ordering of the data items; wherein the prioritisation circuitry is configured to select the one or more candidate data items before the identification of the hitting data items is available from the tag match circuitry; and data item selection circuitry configured to select as a selected data item for the data access operation, a candidate data item for which the tag match circuitry detected a match.

BRIEF DESCRIPTION OF THE DRAWINGS

Further aspects, features, and advantages of the present technique will be apparent from the following description of examples, which is to be read in conjunction with the accompanying drawings, in which:

FIGS. 6A-6B show worked examples of assigning tag group identifiers when new data items are allocated;

FIGS. 8A-8B show worked examples of managing tag group identifiers when deallocating data items;

FIG. 10 shows a worked example of managing tag group identifiers when deallocating a data item in a skew-associative data storage structure;

FIG. 11 shows another worked example of managing the tag group identifiers when deallocating a data item in a skew-associative data storage structure.

DESCRIPTION OF EXAMPLES

Figure 1:
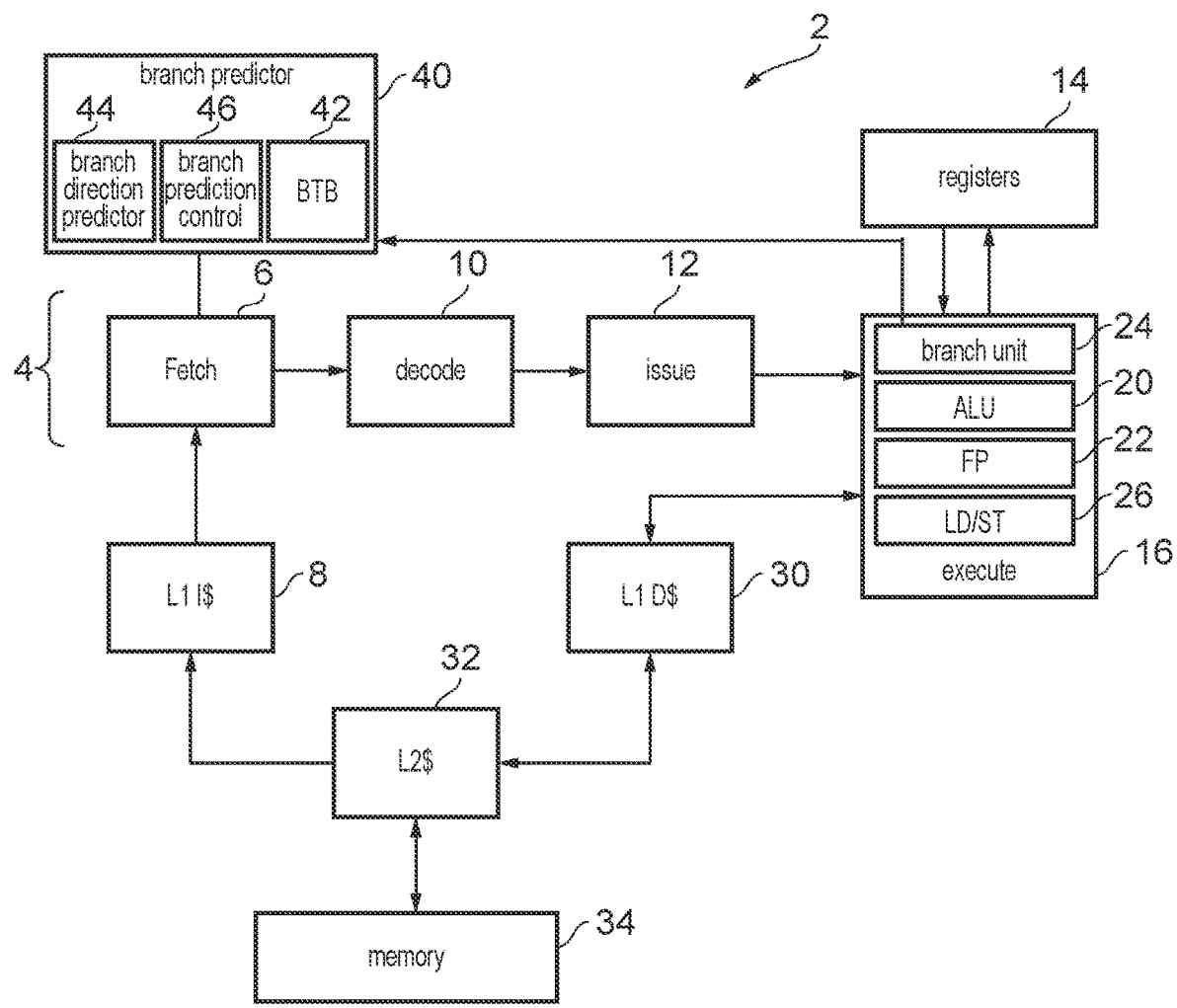
FIG. 1 illustrates an example of an apparatus in which the techniques described herein may be employed.

Before discussing the examples with reference to the accompanying figures, the following description of examples is provided.

In some cases, data storage structures are able to store more than one data item matching the address specified in data access operations used to access data in the storage structure. Accordingly, a data processing apparatus may impose a set of criteria by which a single data item to return can be selected from amongst multiple potential matching (or hitting) data items.

One example of such a selection may occur in a branch target buffer (BTB) which stores information identifying predicted targets of branch instructions (i.e., information to identify an address of a subsequent instruction to be executed in the case that a particular branch instruction is taken). The BTB may be responsive to a data access operation identifying a block of instructions (referred to as a predict block) and specifying a start address in that block to return a target of the first branch instruction in that predict block that is predicted to be taken following the start address. The BTB may store target information for multiple branch instructions in that predict block and so the address of the predict block may hit on more than one item of prediction information in the BTB. To select one data item to return, the BTB may prioritise amongst the hitting entries based on an ordering of the data items. In doing so, the BTB may select the data item relating to the branch instruction associated with the lowest address. Some additional criteria may also be applied to the selection (i.e., to only select prediction information relating to branches predicted as taken and branches following the starting address).

In accordance with the techniques described herein, there is provided an apparatus having a data storage structure to store data items tagged by respective tag values. The tag values allow data items to be identified within a given collection of data items. For a data access operation specifying a particular tag value, a data item relevant to that data access operation within a particular collection of data items can be determined as a hitting data item if the tag value associated with the data item matches a tag value specified by the data access operation. The data storage structure may be arranged to store data such that a data access operation can hit on more than one data item in the collection of data items (i.e., more than one data item in the collection of data items has the tag value specified by the data access operation). In this case, a selection or prioritisation of the hitting data items can be performed to identify one data item as the selected data item to be returned in response to the data access operation.

This prioritisation is based on an ordering of the data items. In some examples, the prioritisation additionally accounts for other criteria. For example, the data items in the data storage structure may identify memory addresses to which they relate. In this case, the ordering may be an ordering of the memory addresses such that the hitting data item with a lower memory address is preferred over a hitting data item with a higher memory address. Where this prioritisation occurs in a BTB, the memory addresses may identify the branch instructions to which each item of prediction information relates. Thus, the prioritisation is used to select, as the selected data item, the target of a first branch instruction. Additional criteria on the selection may be imposed so that only a branch that is predicted as being taken and that occurs after a specified offset is selected.

It should be noted that where the data items identify memory addresses, the data item may not specify the full memory address itself and instead the memory address may be identified by an offset portion of the memory address stored as part of the data item. A tag portion of the address may be identified based on the tag associated with the data item and an index portion of the memory address (if used) may be identified based on the particular collection of data items to which the data item belongs.

One approach to identifying a selected data item in response to a data access operation involves first performing a tag match process to compare the tag value specified by the data access operation with the tag values associated with the data items in a particular collection of data items to identify any hitting data items. If two or more hitting data items are identified, the selected data item could then be determined based on applying the prioritisation. However, the tag match process involves a comparison of tag values which typically comprise a relatively large portion of a memory address and consequently can take a relatively long time to complete. Therefore, according to the approach whereby the prioritisation is carried out on the hitting data items, the prioritisation is dependent on the tag match procedure and so cannot be performed until the results of the tag match are available. The process of selecting a data item can therefore introduce a significant latency when responding to a data access operation. This impact is exacerbated when several hitting data items that need to be prioritised between are identified in the tag match. This increased latency where multiple hitting data items are identified in the tag match can negatively impact performance. Additionally, where the data storage structure is a BTB, this increased latency may lead to the results of an operation to obtain a target address being received too late for a prediction to be based on the returned target and so can prevent predictions being made in respect of the target.

In accordance with the techniques described herein however, there is provided an approach to selecting a data item from the data storage structure that is able to select a data item from the data storage structure with a lower latency while maintaining the ability to handle the situation where the data storage structure contains multiple hitting data items. Rather than waiting until the results of the tag match are available to carry out the prioritisation on only the hitting data items, according to the techniques described herein, the prioritisation is carried out within groups of data items having the same tag value as each other, with the selected data item being selected from amongst any candidate data items identified in the prioritisation based on the results of the tag match.

To support this approach, the data storage structure is arranged to store, in association with each data item, a respective tag group identifier to identify other data items having a same tag value. The tag group identifier may not identify directly the tag value of the data item but the tag group identifiers are arranged such that data items within a given collection of data items having the same tag value, will share the same tag group identifier (that is different from the tag group identifier of data items with a different tag value). The tag group identifiers may therefore be used to identify tag groups, groups of data items within the given collection of data items sharing tag value.

Since the tag group identifier does not need to identify the tag value itself, the tag group identifier can be significantly shorter than the tag value. For example, where each collection of data items represents a set within a set-associative data storage structure, the same number of tag group identifiers may be provided as the number of ways in each set. So for a 4-way set associative storage structure, the four tag group identifiers could be encoded using only two bits. For a 3-way set-associative storage structure, only three distinct tag group identifiers need to be provided which can again be encoded using only two bits. With such short tag group identifiers, comparisons between tag group identifiers can be performed more quickly than comparisons based on tag values.

The tag group identifiers are applied for a particular collection of data items to identify groups of data items within the collection that have the same tag value. Tag group identifiers may however be reused for another collection of data items within the data storage structure (if there is such a collection of data items). In this sense, the tag group identifiers are applied on a per-collection basis. The particular collection of data items may be identified for a data access operation based on an index portion of the address specified by the data access operation. In an associative data storage structure for example, the collection of data items may refer to a lookup set of data items identified based on the index portion of the address. In a fully associative storage structure however, the collection of data items may comprise all of the data items in the storage structure. In some examples, the number of tag group identifiers supported could be smaller than the number of possible different tag values in a collection of data items. For example, in a fully-associative data storage structure with more than four entries, a 2-bit tag group identifier could be used (thereby providing four possible tag group identifiers). This may be done to reduce the size of the tag group identifiers (and thereby allow faster comparisons of the tag group identifiers to be performed) where some imprecision in the identification of hitting data items can be tolerated (e.g., as part of a prediction process). Thus, even if the reuse of a tag group identifier value for more than one tag value in the fully-associative data storage structure led to a hitting data item present in the storage structure not being identified, this may be tolerated where it enabled faster comparisons of the tag group identifiers to be carried out.

In accordance with the techniques described herein, the apparatus is provided with prioritisation circuitry that applies the ordering and any other criteria to select one or more candidate data items. The prioritisation circuitry is configured to select the candidate data items such that each candidate data item is a data item which, relative to any other data items in the particular collection of data items having the same tag group identifier as the selected candidate data item is favoured according to an ordering of the data items. This process is not dependent on the outcome of a tag match (i.e., is not dependent on which of the data items match the tag value specified by the data access operation) and so the prioritisation circuitry is configured to commence selecting the candidate data items before a tag match has been performed. The prioritisation can therefore proceed independently of the comparison of tag values such that the one or more candidate data items selected are the preferred data items within each tag group.

Separately, the apparatus performs the tag match using tag match circuitry. The tag match circuitry is configured to identify any hitting data items in the collection of data items by comparing the tag values of the data items with a specified tag value for the data access operation.

Once the candidate data items and the hitting data items have been determined, data item selection circuitry can select as the selected data item, a candidate data item that is also a hitting data item for which the tag match circuitry detected a match.

By performing the prioritisation based on tag group identifiers, the dependence of the prioritisation on the tag match can be removed, allowing the prioritisation to be commenced earlier and the latency incurred by needing to apply the ordering when multiple hitting data items are identified reduced.

Where this technique is applied in a BTB, the reduced latency for returning a data item comprising prediction information may enable the apparatus to make a prediction that would otherwise not have been possible due to the timing with which the target information was available. Consequently, the performance of the apparatus may be further improved by virtue of enabling more accurate branch prediction.

The candidate data items could be selected by the prioritisation circuitry in a number of possible ways. In some examples, the candidate data items may be selected on a per-tag-group-identifier basis whereby the prioritisation circuitry selects a candidate data item for a given tag group identifier on the basis of the candidate data item having the given tag group identifier and the candidate data item being favoured in the ordering relative to any other data items also having the given tag group identifier. That is to say, for each tag group identifier, the prioritisation circuitry may select a candidate data item with that tag group identifier, that is favoured in the ordering over other data items in the collection having that tag group identifier. Where no data items in the collection have a particular tag group identifier, the prioritisation circuitry might not identify a candidate data item for the tag group identifier or may provide an invalid or null result. This approach may be implemented using a collection of multiplexers where each multiplexer corresponds to a different tag group identifier. Each multiplexer can then select a candidate data item for its associated tag group identifier from among the collection of data items (or not select a candidate data item if there are no data items in the collection having the associated tag group identifier).

Another way in which the prioritisation circuitry could identify the candidate data items is on a per-data-item approach. According to such an approach, the prioritisation circuitry may be arranged to determine, for each data item in the particular collection of data items, whether to identify that data item as a candidate data item based on comparing that data item with any other data items in the particular collection of data items having the same tag group identifier. If such other data items are preferred in the ordering, then the data item in question is not indicated as being a candidate data item whereas if the data item being considered is preferred in the ordering then the data item will be identified as a candidate data item. Accordingly, at most a single candidate data item will be identified for each tag group identifier with the candidate data items being those that are preferred in the ordering over any other data items with the same tag group identifier. Since the output for each data item can be represented as a single bit indicating whether the data item is identified as a candidate data item or not, this bit can be combined with a bit indicative of whether a match in the tag comparison was detected for that data item using a single bitwise operation (e.g., an AND). The selected data item will be the only data item for which the data item was indicated as a candidate data item and for which the tag match was successful.

As well as applying the ordering, the prioritisation circuitry may be arranged to exclude any data items that occur before a start offset. For example, where the data items contain an offset to identify a memory address to which they relate (e.g., the address of an instruction to which the data item relates), the prioritisation circuitry may be arranged to select the first data item following the start offset, thereby applying the ordering whilst excluding any data items occurring before the start offset.

Additionally or alternatively, the prioritisation circuitry may be arranged to exclude data items based on an indication of data items to be excluded received by the prioritisation circuitry. For example, where the data storage structure is a BTB, the prioritisation circuitry may receive an indication of branches that are predicted as being taken. The prioritisation circuitry may therefore be arranged to exclude from consideration any data items relating to branches that are not predicted as being taken.

By excluding both data items occurring before the start offset and data items relating to non-taken branches, the prioritisation circuitry can select for one or more tag group identifiers, a candidate data item representing the first taken branch following the start offset.

In some examples, the data storage structure is a cache, such as an instruction cache or a BTB for caching prediction information identifying predicted targets of control flow changing instructions. Where the data storage structure is an instruction cache, the instruction cache may be tagged by an address of a block of instructions. In response to a data access operation specifying a start offset and prediction information identifying any branches occurring in the block of instructions that are predicted as taken, the apparatus may be arranged to return as the selected data items any instructions in the block of instructions that occur after the start offset and before the first branch that is predicted as taken (if the block contains a branch that is predicted taken).

Where the data storage structure is a BTB storing prediction information to identify predicted targets of control flow changing instructions, the data item selection circuitry may be configured to select as the selected data item, prediction information that identifies the predicted target of the first control flow changing instruction that is predicted as being taken and that occurs after a specified start offset. The selected target therefore identifies the next instruction (or block of instructions) to be fetched. Branch prediction control circuitry may make use of the predicted targets from the BTB selected in this way to determine branch predictions to be made and consequently the order in which instructions should be fetched from the memory system.

The control flow changing instructions may be branch instructions, return instructions, or any other instructions that alter the control flow of program code being executed from a sequential flow of consecutive instructions.

To enable the data item selection circuitry to only select data items corresponding to control flow changing instructions that are predicted as being taken, the prioritisation circuitry is responsive to direction prediction information received, for example, from dedicated branch direction prediction circuitry or other sources of direction prediction information. The direction prediction information identifies whether control flow changing instructions are predicted as being taken or not, and the prioritisation circuitry is configured to exclude any data items that represent a predicted target for a not-taken control flow changing instruction thereby preventing such data items from being identified as a candidate data item.

To allow the prioritisation circuitry to efficiently and accurately select the candidate data items, tag group identifier setting circuitry may be provided to maintain the tag group identifiers in the data storage structure. The tag group identifier setting circuitry may do this in such a way that within any given collection of data items, data items having the same tag value have the same tag group identifier whereas data items having different tag values have different tag group identifiers.

Although similar techniques may be employed in data storage structures with other arrangements, the tag group identifier setting circuitry in some examples is arranged to operate on an associative data storage structure for which each data item has a corresponding collection of entries in the data storage structure (referred to as a lookup set) into which the data item can be placed. The lookup set may contain a plurality of entries (referred to as ways) into which the data item can be validly placed which store the particular collection of data items identified by the data access operation. The lookup set corresponding to a particular data item may be identified based on an index portion of the address of the data item. Where the data storage structure is a fully associative data storage structure, each data item may be able to be stored in any entry in the data storage structure. In either case, the way in which a particular data item is stored can then be identified based on matching a tag portion of the address of the data item with a tag value stored in association with the data item.

Considering first the setting of tag group identifiers for new data items being allocated into the data storage structure, when a new data item is allocated into the data storage structure, the lookup set into which the data item is allocated may already have one or more data items with the same tag value or may have no data items with the same tag value as the new data item. Where there are other data items in the lookup set with the same tag value, to ensure that data items within the lookup set sharing the same tag value have the same tag group identifier, the tag group identifier setting circuitry allocates the new data item the tag group identifier of the other data items having the same tag value.

On the other hand, when there are no other data items in the lookup set that have the same tag value as the new data item, the new data item should be assigned a tag group identifier different from the tag group identifier of any other data items in the lookup set. To this end, each way in the lookup set may have its own default tag group identifier. The tag group identifier setting circuitry may assign as the tag group identifier for the new data item, the default tag group identifier of the way into which the data item is allocated. This ensures that by default, when no other data items having the same tag value are present in the same lookup set, the data items allocated in different ways will have different tag group identifiers. This approach also avoids the need to check the tag group identifiers of the other data items in the set to ensure that distinct tag group identifiers are used and means that the data storage structure only needs to support a number of tag group identifier values equal to the number of ways in the data storage structure.

The tag group identifier setting circuitry may be arranged to ensure, that on deallocation of a data item from the data storage structure, a default tag group identifier for one way is not used to identify a group of data items that do not occupy the way for which the tag group identifier is the default tag group identifier. If this were allowed to occur, on allocation of a new data item to that way, the new data item could be assigned the default tag group identifier even though the tag value of the new data item did not match the tag values of the other data items using that tag group identifier.

Accordingly, the tag group identifier setting circuitry is configured to check when deallocating a data item, whether the data item has the default tag group identifier for the way in which it is stored. If the data item has a tag group identifier other than the default tag group identifier, the data item can be safely deallocated. However, if the data item being deallocated has the default tag group identifier for its way, in addition to deallocating the data item, the tag group identifier setting circuitry identifies any other data items in the lookup set with that tag group identifier. The tag group identifiers for those other data items are then changed to the default tag group identifier of a way containing one of those data items.

Deallocation of a data item may involve deletion of a data item from the data storage structure, replacement of a data item by another data item or marking the data item as invalid in the data storage structure.

The associative data storage structure may be a set-associative data storage structure for which the lookup set is the same as a replacement set. A replacement set is a collection of data items considered together for the purpose of implementing a replacement policy. That is, when determining which data items to replace in a data storage structure in order to make space for new data items, the replacement is managed within replacement sets such that the replacement policy determines which of the data items in a particular replacement set to replace. For a set-associative data storage structure, the lookup sets directly correspond to the replacement sets.

However, in some examples, the data storage structure is a skew-associative data storage structure. For a skew-associative data storage structure, replacement sets do not correspond directly to lookup sets. Accordingly, within a given replacement set, there may be data items belonging to multiple different lookup sets. This can be implemented by adjusting the mapping function used to identify the location of the entry in the data storage structure for each different way of a lookup set. As such, a different offset may be used to identify the entry corresponding to way 0 of a particular lookup set as compared to way 1 of the lookup set. Using a skew-associative data storage structure can reduce the likelihood of frequently used data corresponding to two different index values but that are mapped to the same lookup set conflicting with each other and leading to replacement of each other's data. Instead, with a skew-associative cache, the different index values will likely be mapped to different replacement sets for different ways such that the two different index values will correspond to the same entry on fewer ways.

Where the tag group identifier setting circuitry performs the check on deallocation of a data item having the default tag group identifier for its way to identify any other data items in the lookup set sharing the same tag value for a skew-associative data storage structure, this involves an additional operation to apply the mapping used to identify the entries corresponding to the lookup set. This additional lookup process can be avoided by instead storing a skew factor in association with the data items indicative of the mapping applied to identify the entry in which the data item is stored. That is, in addition to the tag group identifier for the data item, when a new data item is allocated, a skew factor representing the mapping (or the skew) applied to identify the entry in which the data item is to be stored may be stored as well. Where two data items could be stored in the same entry but the entry has been identified based on a different index portion of the address, the skew applied to identify that entry will be different and so the skew factor stored would be different. The prioritisation circuitry can then select only a candidate data item for which the skew factor stored in association with the data item matches a skew factor applied by the data access operation to identify the data item as part of the collection of the data items being considered. On deallocation of a data item, the tag group identifier setting circuitry no longer needs to reassign tag group identifiers where the deallocated data item has the default tag group identifier for its way. If another data item associated with a memory address with a different index portion replaces the deallocated data item and uses the default tag group identifier as its tag group identifier, the skew factor stored for that new data item will prevent that data item erroneously being identified as a candidate data item for a data access operation that accesses that entry but based on a different index portion.

This approach avoids the need to compute the mapping to identify the other data items in the same lookup set when deallocating a data item having as its tag group identifier the default tag group identifier for the way in which the data item is stored.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 illustrates an example of an apparatus 2 in which the techniques described herein may be employed. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and writing the results of the processing back to the register file 14. It will be appreciated that this is merely one example of a possible pipeline architecture, and other systems may have additional stages or a different configuration of stages. For example, in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, a branch direction predictor (BDP) 44 for predicting the not taken/taken outcome (branch direction), and branch prediction control circuitry 46 to control the predictions made on the basis of the branch direction predictor 44 and the BTB 42. It will be appreciated that the branch predictor 40 could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

The branch predictor 40 may also be arranged to receive signals from the branch unit 24 indicating the actual branch outcome of instructions, such as indications of whether a taken branch was detected in a given block of instructions, and if so the detected branch type, target address or other properties. If a branch was detected to be not taken then this is also provided. The state within the BTB 42, the branch direction predictor 44 and other branch prediction structures can then be altered to take account of the actual results seen for an executed block of instructions, so that it is more likely that on encountering the same block of instructions again then a correct prediction can be made.

Figure 2:
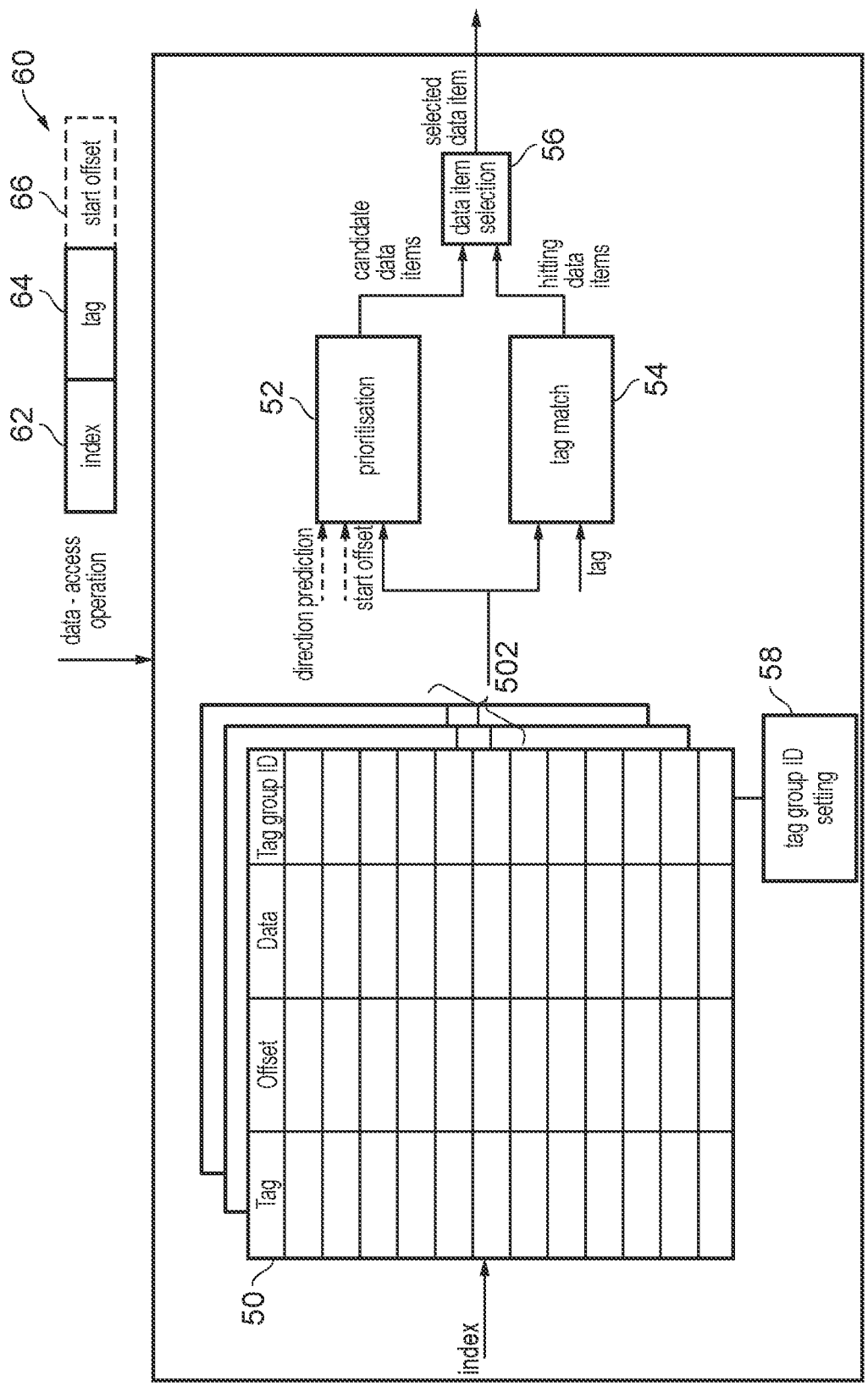
FIG. 2 illustrates an apparatus according to an example.

FIG. 2 illustrates an apparatus according to an example. The apparatus has a data storage structure 50 which in this example is a branch target buffer 42 but could in other examples be an instruction cache 8 or another form of cache/storage structure.

The storage structure 50 has a plurality of entries to store data and is arranged according to an associative structure so that data items associated with a memory address having a particular index portion will be stored in a particular set (corresponding to a particular row as illustrated schematically in FIG. 2) but can be stored in any of the three ways (with additional ways depicted schematically as extending behind the first way). A tag portion of the memory address with which the data item is associated is stored in association with the data item.

FIG. 2 also depicts a data access operation to request access to the data storage structure 50, the data access operation specifying a memory address 60. The memory address comprises an index portion 62, a tag portion 64, and optionally a start offset portion 66. The index portion is used to identify the set 502 in the data storage structure 50 to which the data access operation relates. The tag portion 64 of the memory address can then be compared against the tags stored in the data storage structure in the identified set

502. If the tag portion 64 of the address 60 specified by the data access operation matches the tag stored in the data storage structure 50, the associated data item can be considered a hitting data item. The start offset portion 66 indicates an offset to be applied such that any data items identifying a memory address occurring before the start offset are to be excluded from selection.

The data storage structure 50 is able to store more than one data item associated with the same memory address. In the case of the data storage structure 50 being a BTB, the memory address specified may identify a predict block—a block of addresses in respect of which branch predictions are made. A single predict block can contain multiple branch instructions (or more generally control flow changing instructions). The BTB may therefore store multiple items of prediction information relating to that predict block indicative of predicted targets for different branch instructions in the predict block.

Also shown in FIG. 2 is prioritisation circuitry 52, tag match circuitry 54, and data item selection circuitry 56 for use in selecting a selected data item among a possible plurality of hitting data items.

Tag match circuitry 54 is provided to compare the tag portion 64 of the specified memory address 60 with the tags of the data items in the set 502 identified by the index portion 62 of the address 60. As discussed above, there may be a plurality of hitting data items in the set 502 and so the tag match circuitry 54 may identify more than one hitting data item. Accordingly, a selection between the hitting data items would need to be performed to identify which hitting data item to select in response to the data access operation.

This selection is performed by data item selection circuitry 56 which is arranged to select one of the hitting data items as a selected data item for the data access operation. The selected data item is one which is preferred in an ordering of data items which in this case is to be the target of the first taken branch instruction following the specified start offset. Rather than applying the ordering to the hitting data items identified by the tag match circuitry 54 once the identification of the hitting data items has been performed, prioritisation circuitry 52 is provided to apply the ordering and any further selection criteria in parallel with the tag match process. Since the prioritisation and the tag match can be performed in parallel, this reduces the time taken to identify a selected data item, particularly where there are a large number of hitting data items between which to prioritise.

The prioritisation circuitry 52 identifies one or more candidate data items for the lookup set based on the tag group identifiers of the data items in the set, along with direction prediction information and the start offset. The prioritisation circuitry 52 identifies at most one candidate data item for each tag group identifier whereby to be identified as a candidate data item, the candidate data item has to be preferred in the ordering (e.g., occur earlier) than any other data items having the same tag group identifier and which are not excluded by virtue of representing a branch that is predicted as not taken or occurring before the specified start offset.

Tag group identifier setting circuitry 58 is also provided to maintain the tag group identifiers in the storage structure 50.

Figure 3:
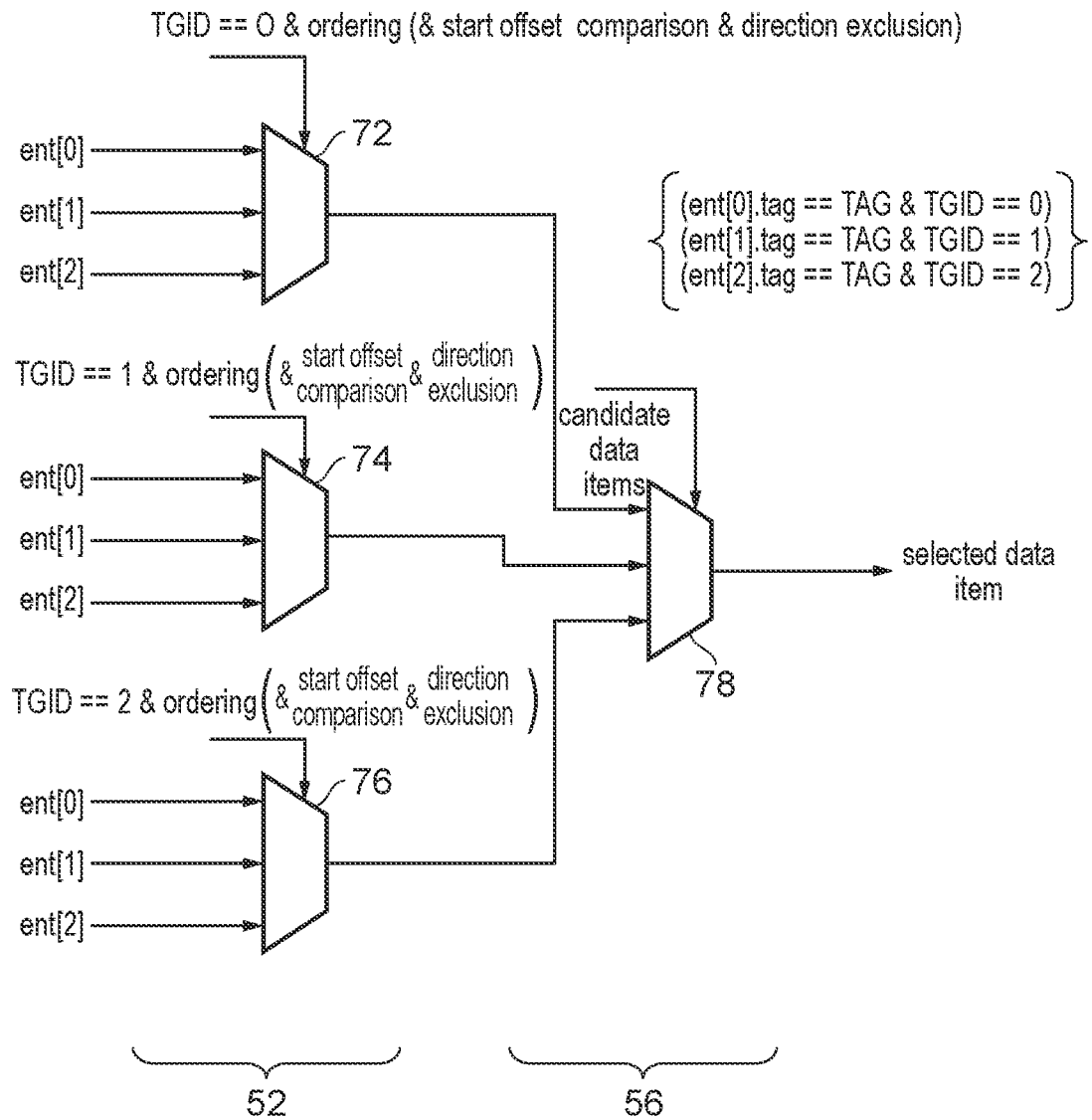
FIG. 3 illustrates the prioritisation circuitry and data item selection circuitry of FIG. 2 in more detail according to one example.

FIG. 3 illustrates the prioritisation circuitry 52 and data item selection circuitry 56 of FIG. 2 in more detail according to one example. In this example, a multiplexer 72, 74, 76 is provided for each possible tag group identifier value. The storage structure 50 in FIG. 2 has three ways and so three possible tag group identifiers are supported in this example. Each multiplexer 72, 74, 76 is arranged to select a candidate data item from amongst the data items in the set. The multiplexer is arranged to select, as the candidate data item, a data item having the tag group identifier associated with the multiplexer that is not excluded based on direction prediction information or applying the start offset, and which is preferred in the ordering. If no candidate data item can be identified for a particular tag group identifier (because there are no non-excluded data items with the relevant tag group identifier), the multiplexer may be arranged to output a null value or may select an arbitrary entry to forward. This selection of candidate data items can be performed without needing to do a tag match since the prioritisation is based on tag group identifiers.

A further multiplexer 78 is provided to select the selected data item from amongst the candidate data items. The multiplexer 78 takes into account the result of the tag match performed by the tag match circuitry 54 to select as the selected data item, a candidate data item for which a match was detected when comparing the tags. The multiplexer 78 and/or associated logic may also be arranged to check that the tag group identifier of the data item provided by the multiplexers 72, 74, 76 matches the tag group identifier associated with the respective multiplexer 72, 74, 76 to exclude any data items that were forwarded by the multiplexers 72, 74, 76 arbitrarily when the multiplexer 72, 74, 76 was not able to identify a valid candidate data item.

Figure 4:
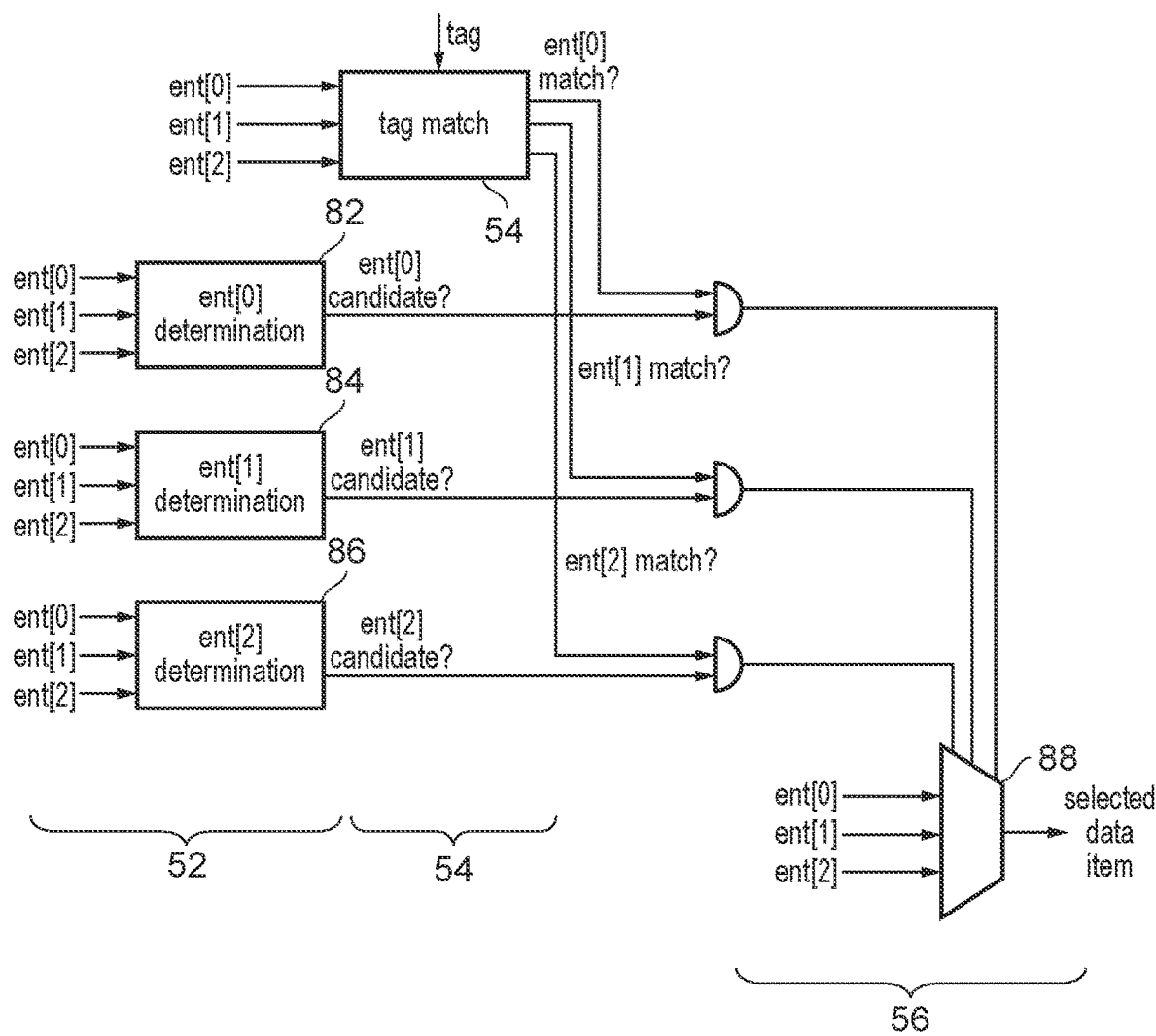
FIG. 4 illustrates the prioritisation circuitry, the data item selection circuitry, and the tag match circuitry of FIG. 2 in more detail according to another example.

FIG. 4 illustrates in detail another example implementation of the apparatus of FIG. 2. In this example, candidate determination circuitry 82, 84, 86 is provided for each way of the storage structure 50. Each element of candidate determination circuitry 82, 84, 86 is arranged to determine whether to identify the data item from the way associated with the candidate determination circuitry 82, 84, 86 as a candidate data item. To determine whether to identify a data item as a candidate data item, the candidate determination circuitry 82, 84, 86 compares the data item from the way associated with that element of candidate determination circuitry 82, 84, 86 with any other data items in the set having the same tag group identifier. If the data item being considered is not-excluded by virtue of representing a branch that is predicted as not-taken or by virtue of occurring before the start offset and is preferred in the ordering over any other data items having the same tag group identifier, the data item can be identified as a candidate data item. Otherwise, the data item is not identified as a candidate data item.

Independently, the tag match circuitry 54 compares each data item with the specified tag value to determine whether the tag of each data item matches the specified tag value. For each data item in the set, the indication of whether a tag match was detected can be combined with the indication of whether the data item was identified as a candidate data item in an AND operation to indicate whether the data item should be selected as the selected data item for the data access operation. The data item selection circuitry 56 can thus comprise a multiplexer 88 to select the selected data item based on this indication.

Figure 5:
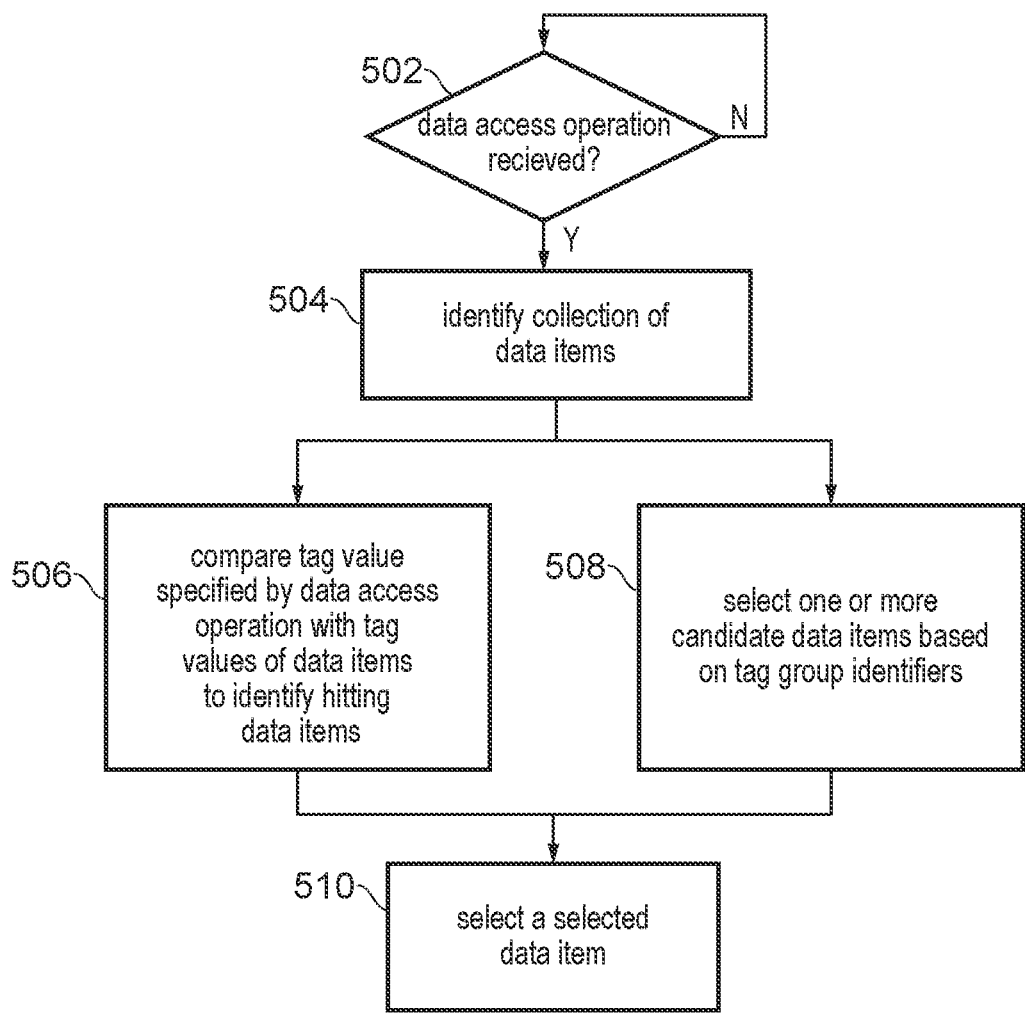
FIG. 5 is a flowchart illustrating the operation of the apparatus according to an example.

FIG. 5 is a flowchart illustrating the operation of the apparatus 2 according to an example. At step 502, it is determined whether a data access operation has been received. If no data access operation has been received, no action needs to be taken. If a data access operation has been received then the flow proceeds to step 504. At step 504, a collection of data items under consideration is identified. In a fully-associative storage structure, the collection of data item may be all of the data items in the storage structure.

However, for an associative storage structure, the collection of data items may comprise a lookup set identified based on an index portion of a memory address specified by the data access operation.

Having identified the collection of data items at step 504, a tag value specified by the data access operation is compared at step 506 with tag values of the data items in the collection of data items to identify any hitting data items. In parallel and independently, one or more candidate data items are identified at step 508 based on the tag group identifiers of the data items in the collection of data items. Notably, this process is not based on the results of comparing the tag values at step 506.

A selected data item in respect of which the data access operation is to be performed is then identified at step 510 by combining the results of the tag match with the selection of the candidate data items (e.g., by selecting the candidate date item for which a tag match was identified).

FIGS. 6A-6B show worked examples of assigning tag group identifiers when new data items are allocated. Each figure contains a table illustrating the contents of one set of the storage structure 50, that set being identified based on an index specified for the new data item to be allocated into the storage structure.

In FIG. 6A, the new data item has a tag value of B and is allocated into a set for which the other data items both have a tag value of A. The new data item therefore has a tag value different than the other data items and so needs to be allocated a tag group identifier that is different from those data items. In this example, each way of the set has a default tag group identifier that corresponds to the number of the way. So for way 1, the default tag group identifier is 1. Since there are no other data items in the set having the same tag value as the new data item, the new data item is allocated the tag group identifier of 1.

FIG. 6B depicts an example in which the new data item shares a tag value with a data item that is already present in the set. The new data item has a tag value of A which is the same as the tag value of the data item in way 0. To ensure that the tag group identifiers can be used to identify data items sharing the same tag value, the tag group identifier for the new data item is set to 0 to be the same as the tag group identifier for the data item in way 0.

Figure 7:
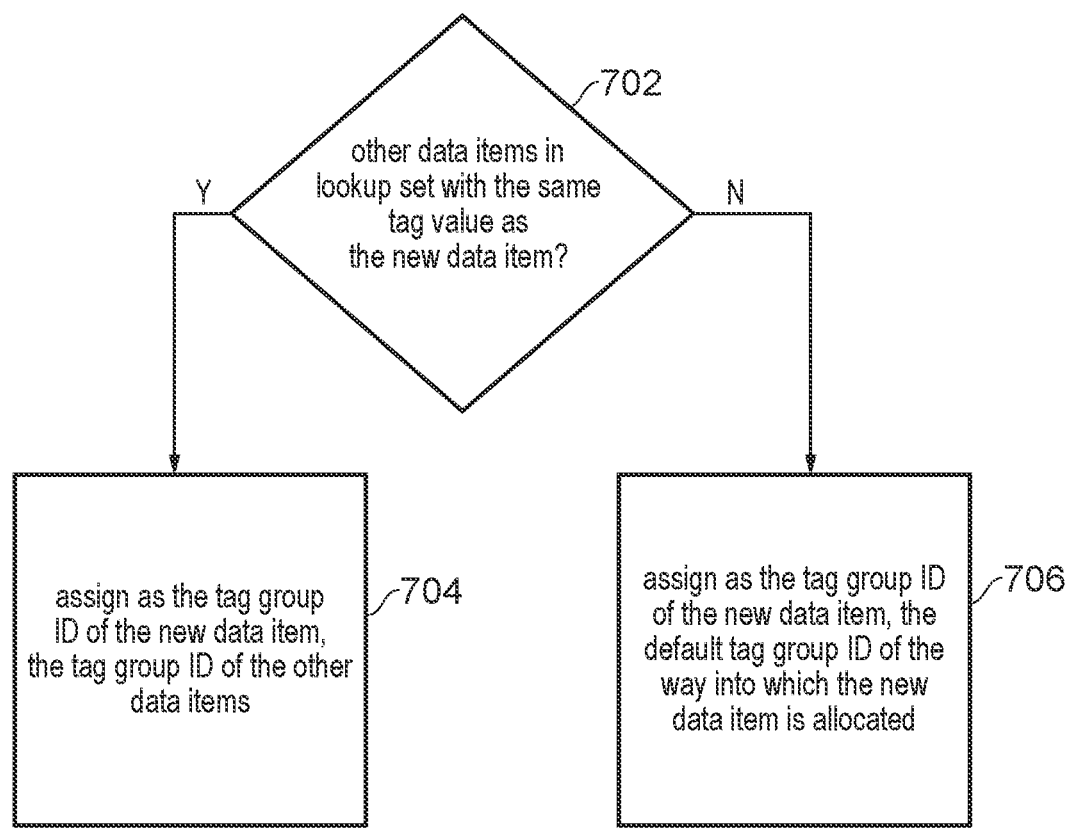
FIG. 7 is a flowchart illustrating the operation of the apparatus to assign a tag group identifier when a new data item is allocated.

FIG. 7 is a flowchart illustrating the operation of the apparatus to assign a tag group identifier when a new data item is allocated. At step 702 it is determined whether there are any other data items in the lookup set into which the new data item is to be allocated that have the same tag value as the new data item. If there are one or more other data items in the lookup set with the same tag value, the tag group identifier for the new data item is set to be the same as the tag group identifiers of those other data items at step 704. On the other hand, if there are not any other data items with the same tag value in the lookup set, the tag group identifier of the new data item is set to a default tag group identifier of the way into which the new data item is allocated at step 706.

FIGS. 8A-8B show worked examples of managing the tag group identifiers when deallocating data items. In each case, a set is depicted from which one data item is to be deallocated.

In FIG. 8A, a data item is to be deallocated from way 1. Here, the data item to be deallocated has a tag group identifier other than the default tag group identifier for its way (the tag group identifier is 0 while the default tag group identifier for the way is 1). Consequently, according to one approach to managing tag group identifiers, the tag group identifier setting circuitry 58 does not need to adjust any other tag group identifiers. This is on the basis that if a subsequent data item were allocated into the set having a distinct tag value different from the tag values of the data items already in the set, the default tag group identifier for the way that has just been deallocated would be different from any of the tag group identifiers currently in use.

On the other hand, if a data item having as its tag group identifier, the default tag group identifier for the way in which it is stored is deallocated, the tag group identifiers of any other data items with the same tag group identifier may need to be updated. An example of this scenario is illustrated in FIG. 8B. The data item in way 0 is to be deallocated, this data item having as its tag group identifier the value 0 which is the default tag group identifier for the way. If this data item were allowed to be deallocated with no further action, a subsequent allocation of a data item into way 0 could lead to a violation of the properties of the tag group identifiers. That is, if a data item having a distinct tag value different from the tag values already in the set were subsequently allocated into way 0, that data item would be assigned the default tag group identifier for way 0. However, as depicted in FIG. 8B, way 1 already contains a data item with a tag group identifier of 0 and so two data items with different tag values would share the same tag group identifier.

To avoid this scenario, when a data item having the default tag group identifier for the way in which it is stored is deallocated, the tag group identifier setting circuitry 58 checks for any other data items in the set having the same tag group identifier. If any other such data items are identified (such as the data item in way 1 of FIG. 8B), the tag group identifiers for those data items are changed to a default tag group identifier of a way storing one of those data items. In the example of FIG. 8B, the tag group identifier for the data item in way 1 is changed to 1, thereby avoiding any conflict between tag group identifiers.

Figure 9:
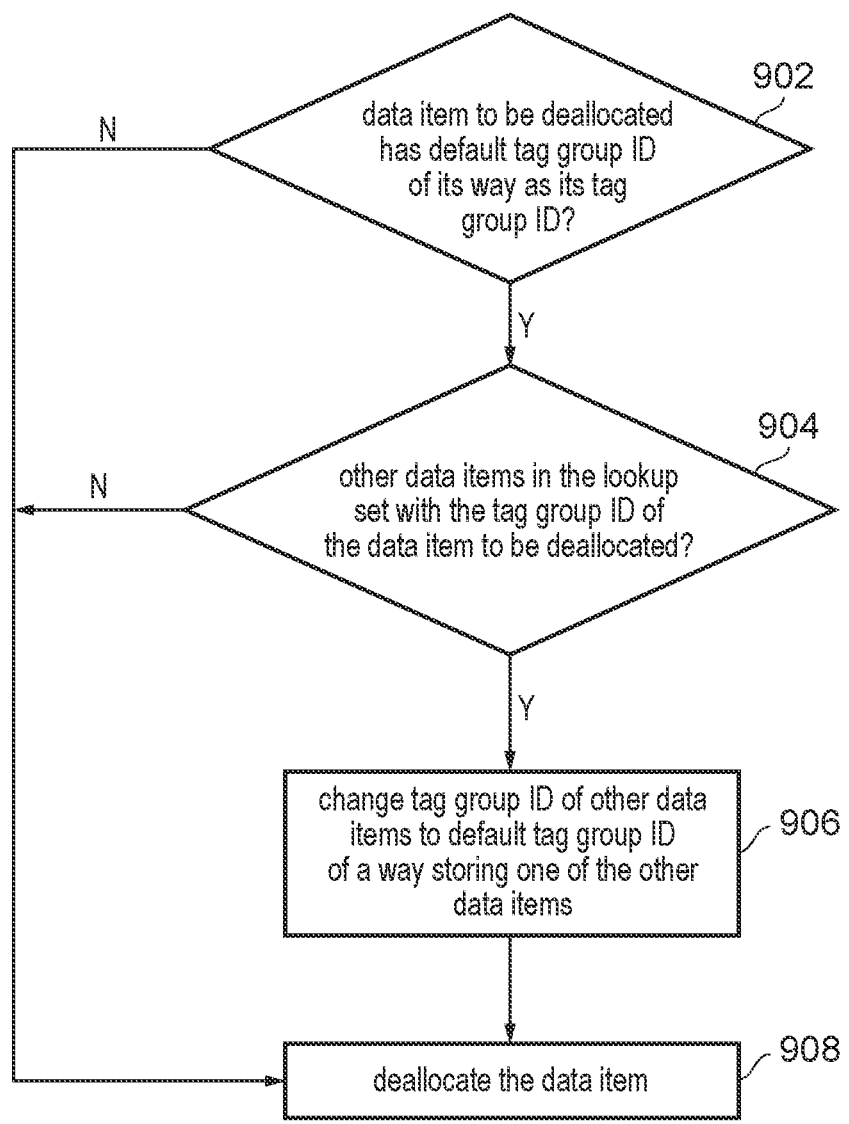
FIG. 9 is a flowchart illustrating the operation of the apparatus to manage tag group identifiers when a data item is deallocated.

FIG. 9 is a flowchart illustrating the operation of the apparatus to manage tag group identifiers when a data item is deallocated. At step 902, it is determined whether a data item to be deallocated has as its tag group identifier, the default tag group identifier of the way in which it is stored. If the tag group identifier of the data item to be deallocated is not the default tag group identifier, the data item can be deallocated at step 908 without any further action.

However, if the data item to be deallocated does have the default tag group identifier for its way, at step 904 it is then checked whether the set has any other data items with the same tag group identifier. If there are no such other data items, then the data item can be deallocated at step 908.

If there are any data items with the same tag group identifier, the tag group identifiers of those other data items are changed at step 906 so that those data items use a default tag group identifier of a way in which one of those data items is stored. The data item to be deallocated can then be safely deallocated at step 908.

Figures 10, 11:
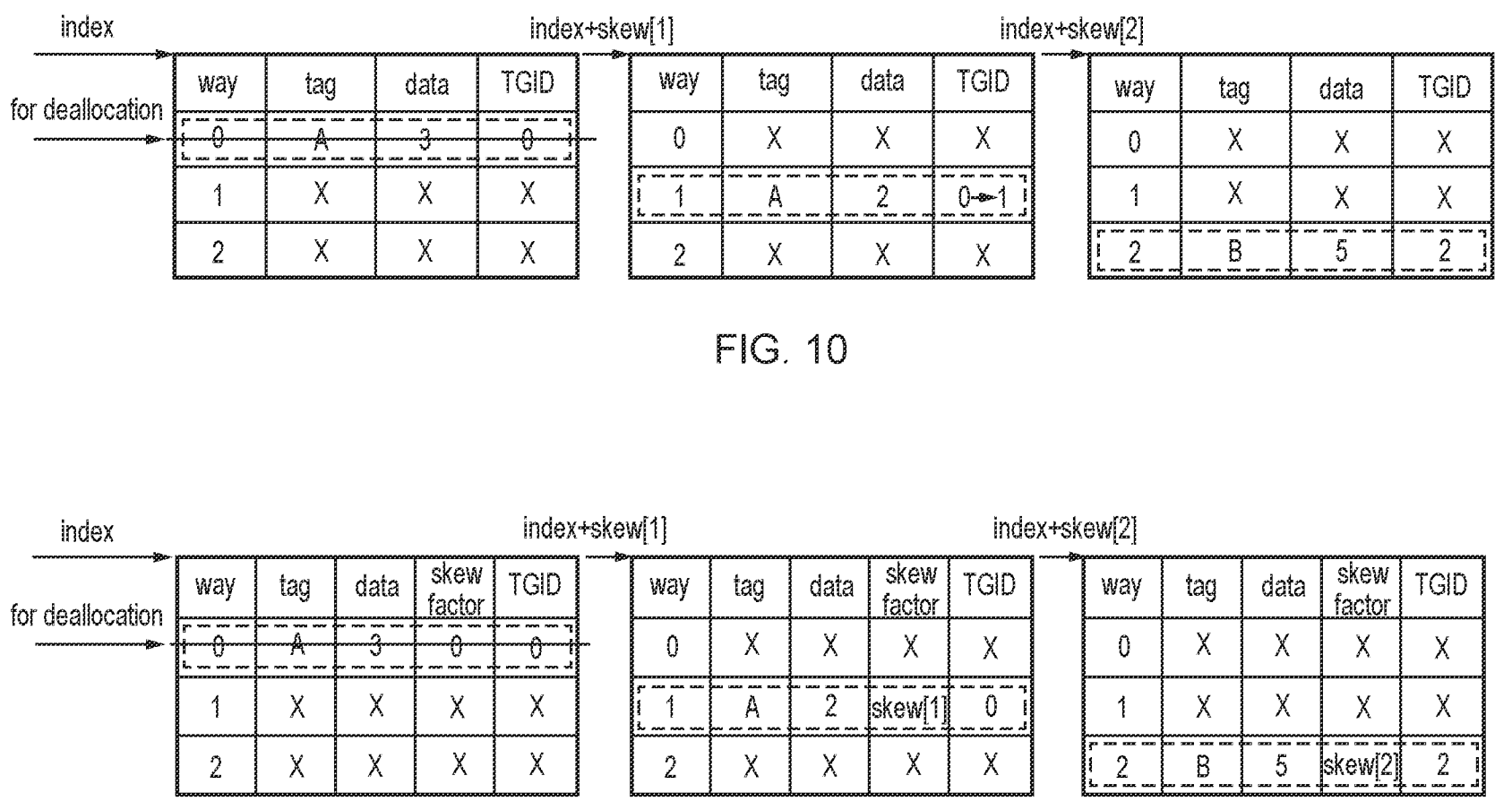

FIG. 10 shows a worked example of managing the tag group identifiers when deallocating a data item in a skew-associative data storage structure. In a skew-associative data storage structure, the data items within a particular lookup set may belong to different replacement sets, where replacement of data items is organised on a per-replacement-set basis. Thus, for a particular index, the mapping used to identify which entries a data item may be allocated into differs for each way. This is illustrated in FIG. 10 for which three replacement sets are shown as separate tables while a particular lookup set distributed across the replacement sets is identified within dotted lines.

Thus, to identify the entries storing data items corresponding to a particular index, the index itself is used to identify the replacement set storing way 0 of the lookup set, a skew factor (skew[1]) is used to modify the index in order to identify the replacement set storing way 1 of the lookup set and a second skew factor (skew[2]) is used to modify the index in order to identify the replacement set storing way 2 of the lookup set.

On modification therefore, a similar process to that described above with respect to FIGS. 8A, 8B and 9 can be carried out. On deallocation of the data item in way 0, the tag group identifier setting circuitry 58 checks whether the tag group identifier for the data item being deallocated is the default tag group identifier for the way from which it is being deallocated. In this example, the tag group identifier is 0 which is the default tag group identifier. The tag group identifier setting circuitry in this case has to perform an additional lookup to identify the mapping to be used to identify the entries storing the other ways of the lookup set containing the data item to be deallocated. With the other data items in the lookup set identified, the tag group identifier setting circuitry 58 can similarly determine whether the lookup set contains any other data items having the same tag group identifier as the data item to be deallocated. Here, way 1 also uses a tag group identifier of 0 and so the tag group identifier for this data item is updated to use the default tag group identifier for the way housing that data item (1 in this case).

FIG. 11 shows another worked example of managing the tag group identifiers when deallocating a data item in a skew-associative data storage structure. In this case, to avoid having to apply the mapping to identify all of the entries in the lookup set when deallocating a data item in the skew-associative storage structure, the skew factor applied to identify the entry in which each data item is stored is additionally stored in the storage structure in association with the corresponding data item. For the data item stored in way 1 of the lookup set (as shown in the middle table of FIG. 11), the skew factor, skew[1] is stored alongside the data item. This skew factor can therefore be used to distinguish between data items whose lookup sets share a common entry but for which the index associated with the data items is different.

The prioritisation circuitry 54 in this example is arranged to also exclude from consideration as a candidate data item, any data items for which the associated skew factor does match a skew factor obtained for the index portion 62 of the address 60 specified by the data access operation. Consequently, when deallocating data items from the skew-associative data storage structure, the tag group identifiers of any data items sharing the tag group identifier of the deallocated data item no longer need to be changed even where the tag group identifier of the deallocated data item is the default tag group identifier of its way. Data items of the same lookup set can be identified separately from data items belonging to a different lookup set (by virtue of the skew factor used) such that the tag group identifier for distinct tag values only needs to be distinct within the same lookup set (and not for other lookup sets that share entries in common). Thus, the correct operation of the apparatus can be ensured whilst avoiding the need to perform an additional lookup to identify the entries of a lookup set when deallocating a data item.

Thus there has been described an apparatus and a method with which the data item to select in response to a data access operation can be more quickly identified, even in cases where there are several hitting data items in a storage structure. Specifically, by removing the dependence of the prioritisation on performing a tag match, the performance of the selection process can be improved.

The techniques described herein are illustrated with the following numbered examples.

Example 1. An apparatus comprising:
 a data storage structure to store data items tagged by respective tag values, wherein the data storage structure is arranged to store, in association with each data item, a respective tag group identifier to identify other data items having a same tag value within a collection of data items; and
 tag match circuitry responsive to a data access operation to identify one or more hitting data items by comparing a particular tag value specified by the data access operation with tag values of a particular collection of data items identified by the data access operation;
 prioritisation circuitry to select one or more candidate data items, each selected candidate data item comprising a data item which, relative to any other data items in the particular collection of data items having the same tag group identifier as the selected candidate data item is favoured according to an ordering of the data items;
 wherein the prioritisation circuitry is configured to select the one or more candidate data items before the identification of the hitting data items is available from the tag match circuitry; and
 data item selection circuitry configured to select as a selected data item for the data access operation, a candidate data item for which the tag match circuitry detected a match.

Example 2. The apparatus according to example 1, wherein the prioritisation circuitry is configured to select a candidate data item for a given tag group identifier based on the candidate data item having the given tag group identifier and the candidate data item being favoured in the ordering relative to any other data items having the given tag group identifier.

Example 3. The apparatus according to example 1, wherein the prioritisation circuitry is arranged to determine, for each data item of the particular collection of data items, whether to identify that data item as a candidate data item based on applying the ordering in a comparison with other data items of the particular collection of data items having the same tag group identifier.

Example 4. The apparatus according to any preceding example, wherein the prioritisation circuitry is configured to select the candidate data items independently of the comparison of the tag values.

Example 5. The apparatus according to any preceding example, wherein:
 the data access operation specifies a start offset; and
 to select the candidate data items, the prioritisation circuitry is configured to exclude any of the particular collection of data items that occur before the start offset.

Example 6. The apparatus according to any preceding example, wherein the data items identify memory addresses to which they relate and the ordering is an ordering of the memory addresses.

Example 7. The apparatus according to any preceding example, wherein the data storage structure is a cache.

Example 8. The apparatus according to any preceding example, wherein:
 the data storage structure is a branch target buffer (BTB) to store prediction information identifying the predicted targets of control flow changing instructions; and the data item selection circuitry is configured to identify a predicted target of a first control flow changing instruction following a start offset that is predicted as taken.

Example 9. The apparatus according to example 8, wherein to select the candidate data items, the prioritisation circuitry is configured to exclude any data items of the particular collection of data items that represent a predicted target for a control flow changing instruction that is predicted as not taken.

Example 10. The apparatus according to example 9, further comprising:
branch direction prediction circuitry to predict whether control flow changing instructions will be taken or not taken;
wherein the prioritisation circuitry is configured to perform the exclusion based on predictions from the branch direction prediction circuitry.

Example 11. The apparatus according to any of examples 8-10, further comprising:
branch prediction control circuitry, wherein the branch prediction control circuitry is configured to base branch predictions on predicted targets from the BTB.

Example 12. The apparatus according to any of examples 1-7, wherein the data storage structure is an instruction cache.

Example 13. The apparatus according to any preceding example, wherein the particular collection of data items is identified based on an index portion of an address specified by the data access operation.

Example 14. The apparatus according to any preceding example, wherein:
the data storage structure is an associative data storage structure; and
the apparatus further comprises tag group identifier setting circuitry to assign tag group identifiers to data items, wherein the tag group identifier setting circuitry is configured to assign as the tag group identifier of a new data item allocated into the data storage structure:
when there are one or more other data items having a same tag value as the new data item in a lookup set into which the new data item is to be allocated, a tag group identifier of the one or more other items; and
when no other data items in the lookup set have the same tag value as the new data item, a default tag group identifier associated with the way into which the new data item is to be allocated.

Example 15. The apparatus according to example 14, wherein:
the tag group identifier setting circuitry is arranged to change, when a data item is deallocated and the data item has the default tag group identifier for a way in which the data item is stored, the tag group identifier for any other data items in the same lookup set as the deallocated data item to a default tag group identifier of a way containing one of said other data items.

Example 16. The apparatus according to example 15, wherein the lookup set comprises the particular collection of data items identified by the data access operation.

Example 17. The apparatus according to example 15 or example 16, wherein the data storage structure is a skew-associative data storage structure.

Example 18. The apparatus according to example 14, wherein:
the data storage structure is a skew-associative data storage structure;
the tag group identifier setting circuitry is arranged to store, in addition to the tag group identifier for the new data item, a skew factor indicative of the mapping applied in order to identify a set in which the new data item is stored; and
the prioritisation circuitry is configured to select the candidate data item based additionally on the skew factor of the candidate data matching a skew factor applied for the data access operation to identify the candidate data item as part of the particular collection of data items.

Example 19. A method of selecting a data item from a data storage structure, the method comprising:
storing data items tagged by respective tag values, wherein the storing comprises storing, in association with each data item, a respective tag group identifier to identify other data items having a same tag value within a collection of data items;
identifying one or more hitting data items by comparing a particular tag value specified by a data access operation with tag values of a particular collection of data items identified by the data access operation;
selecting one or more candidate data items, each selected candidate data item comprising a data item which, relative to any other data items in the particular collection of data items having the same tag group identifier as the selected candidate data item is favoured according to an ordering of the data items;
wherein selecting the one or more candidate data items is performed before the identification of the hitting data items is available; and
selecting as a selected data item for the data access operation, a candidate data item for which the tag match circuitry detected a match.

Example 20. A non-transitory computer-readable medium to store computer-readable code for fabrication of an apparatus comprising:
a data storage structure to store data items tagged by respective tag values, wherein the data storage structure is arranged to store, in association with each data item, a respective tag group identifier to identify other data items having a same tag value within a collection of data items; and
tag match circuitry responsive to a data access operation to identify one or more hitting data items by comparing a particular tag value specified by the data access operation with tag values of a particular collection of data items identified by the data access operation;
prioritisation circuitry to select one or more candidate data items, each selected candidate data item comprising a data item which, relative to any other data items in the particular collection of data items having the same tag group identifier as the selected candidate data item is favoured according to an ordering of the data items;
wherein the prioritisation circuitry is configured to select the one or more candidate data items before the identification of the hitting data items is available from the tag match circuitry; and
data item selection circuitry configured to select as a selected data item for the data access operation, a candidate data item for which the tag match circuitry detected a match.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes and modifications can be effected therein by one skilled in the art without departing from the scope and spirit of the invention as defined by the appended claims.

The invention claimed is:

1. An apparatus comprising:
a data storage structure to store data items tagged by respective tag values, wherein the data storage structure is arranged to store, in association with each data item, a respective tag group identifier to identify other data items having a same tag value within a collection of data items; and
tag match circuitry responsive to a data access operation to identify one or more hitting data items by comparing a particular tag value specified by the data access operation with tag values of a particular collection of data items identified by the data access operation;
prioritisation circuitry to select one or more candidate data items, each selected candidate data item comprising a data item which, relative to any other data items in the particular collection of data items having the same tag group identifier as the selected candidate data item is favoured according to an ordering of the data items;
wherein the prioritisation circuitry is configured to select the one or more candidate data items before the identification of the hitting data items is available from the tag match circuitry; and
data item selection circuitry configured to select as a selected data item for the data access operation, a candidate data item for which the tag match circuitry detected a match, wherein
the data storage structure is an associative data storage structure; and
the apparatus further comprises tag group identifier setting circuitry to assign tag group identifiers to data items, wherein the tag group identifier setting circuitry is configured to assign as the tag group identifier of a new data item allocated into the data storage structure:
when there are one or more other data items having a same tag value as the new data item in a lookup set into which the new data item is to be allocated, a tag group identifier of the one or more other items; and
when no other data items in the lookup set have the same tag value as the new data item, a default tag group identifier associated with the way into which the new data item is to be allocated.

2. The apparatus according to claim 1, wherein the prioritisation circuitry is configured to select a candidate data item for a given tag group identifier based on the candidate data item having the given tag group identifier and the candidate data item being favoured in the ordering relative to any other data items having the given tag group identifier.

3. The apparatus according to claim 1, wherein the prioritisation circuitry is arranged to determine, for each data item of the particular collection of data items, whether to identify that data item as a candidate data item based on applying the ordering in a comparison with other data items of the particular collection of data items having the same tag group identifier.

4. The apparatus according to claim 1, wherein the prioritisation circuitry is configured to select the candidate data items independently of the comparison of the tag values.

5. The apparatus according to claim 1, wherein:
the data access operation specifies a start offset; and
to select the candidate data items, the prioritisation circuitry is configured to exclude any of the particular collection of data items that occur before the start offset.

6. The apparatus according to claim 1, wherein the data items identify memory addresses to which they relate and the ordering is an ordering of the memory addresses.

7. The apparatus according to claim 1, wherein the data storage structure is a cache.

8. The apparatus according to claim 1, wherein:
the data storage structure is a branch target buffer (BTB) to store prediction information identifying the predicted targets of control flow changing instructions; and
the data item selection circuitry is configured to identify a predicted target of a first control flow changing instruction following a start offset that is predicted as taken.

9. The apparatus according to claim 8, wherein to select the candidate data items, the prioritisation circuitry is configured to exclude any data items of the particular collection of data items that represent a predicted target for a control flow changing instruction that is predicted as not taken.

10. The apparatus according to claim 9, further comprising:
branch direction prediction circuitry to predict whether control flow changing instructions will be taken or not taken;
wherein the prioritisation circuitry is configured to perform the exclusion based on predictions from the branch direction prediction circuitry.

11. The apparatus according to any of claim 8, further comprising:
branch prediction control circuitry, wherein the branch prediction control circuitry is configured to base branch predictions on predicted targets from the BTB.

12. The apparatus according to claim 1, wherein the data storage structure is an instruction cache.

13. The apparatus according to claim 1, wherein the particular collection of data items is identified based on an index portion of an address specified by the data access operation.

14. The apparatus according to claim 1, wherein:
the tag group identifier setting circuitry is arranged to change, when a data item is deallocated and the data item has the default tag group identifier for a way in which the data item is stored, the tag group identifier for any other data items in the same lookup set as the deallocated data item to a default tag group identifier of a way containing one of said other data items.

15. The apparatus according to claim 14, wherein the lookup set comprises the particular collection of data items identified by the data access operation.

16. The apparatus according to claim 15, wherein the data storage structure is a skew-associative data storage structure.

17. The apparatus according to claim 1, wherein:
the data storage structure is a skew-associative data storage structure;
the tag group identifier setting circuitry is arranged to store, in addition to the tag group identifier for the new data item, a skew factor indicative of the mapping applied in order to identify a set in which the new data item is stored; and
the prioritisation circuitry is configured to select the candidate data item based additionally on the skew factor of the candidate data matching a skew factor applied for the data access operation to identify the candidate data item as part of the particular collection of data items.

18. A method of selecting a data item from a data storage structure, the method comprising:
storing data items tagged by respective tag values, wherein the storing comprises storing, in association with each data item, a respective tag group identifier to identify other data items having a same tag value within a collection of data items;
identifying one or more hitting data items by comparing a particular tag value specified by a data access operation with tag values of a particular collection of data items identified by the data access operation;
selecting one or more candidate data items, each selected candidate data item comprising a data item which, relative to any other data items in the particular collection of data items having the same tag group identifier as the selected candidate data item is favoured according to an ordering of the data items;
wherein selecting the one or more candidate data items is performed before the identification of the hitting data items is available; and
selecting as a selected data item for the data access operation, a candidate data item for which the tag match circuitry detected a match, wherein
the data items are stored in an associative data storage structure; and
tag group identifiers are assigned to data items, wherein the tag group identifier of a new data item allocated into the data storage structure is assigned:
when there are one or more other data items having a same tag value as the new data item in a lookup set into which the new data item is to be allocated, a tag group identifier of the one or more other items; and
when no other data items in the lookup set have the same tag value as the new data item, a default tag group identifier associated with the way into which the new data item is to be allocated.

19. A non-transitory computer-readable medium to store computer-readable code for fabrication of an apparatus comprising:
a data storage structure to store data items tagged by respective tag values, wherein the data storage structure is arranged to store, in association with each data item, a respective tag group identifier to identify other data items having a same tag value within a collection of data items; and
tag match circuitry responsive to a data access operation to identify one or more hitting data items by comparing a particular tag value specified by the data access operation with tag values of a particular collection of data items identified by the data access operation;
prioritisation circuitry to select one or more candidate data items, each selected candidate data item comprising a data item which, relative to any other data items in the particular collection of data items having the same tag group identifier as the selected candidate data item is favoured according to an ordering of the data items;
wherein the prioritisation circuitry is configured to select the one or more candidate data items before the identification of the hitting data items is available from the tag match circuitry; and
data item selection circuitry configured to select as a selected data item for the data access operation, a candidate data item for which the tag match circuitry detected a match, wherein
the data storage structure is an associative data storage structure; and
the apparatus further comprises tag group identifier setting circuitry to assign tag group identifiers to data items, wherein the tag group identifier setting circuitry is configured to assign as the tag group identifier of a new data item allocated into the data storage structure:
when there are one or more other data items having a same tag value as the new data item in a lookup set into which the new data item is to be allocated, a tag group identifier of the one or more other items; and
when no other data items in the lookup set have the same tag value as the new data item, a default tag group identifier associated with the way into which the new data item is to be allocated.

\* \* \* \* \*